Jan. 13, 1931.  H. ROWNTREE  1,788,409
ENGINELESS TREADLE CONTROL FOR VEHICLE DOORS
Filed Jan. 7, 1928  4 Sheets-Sheet 1
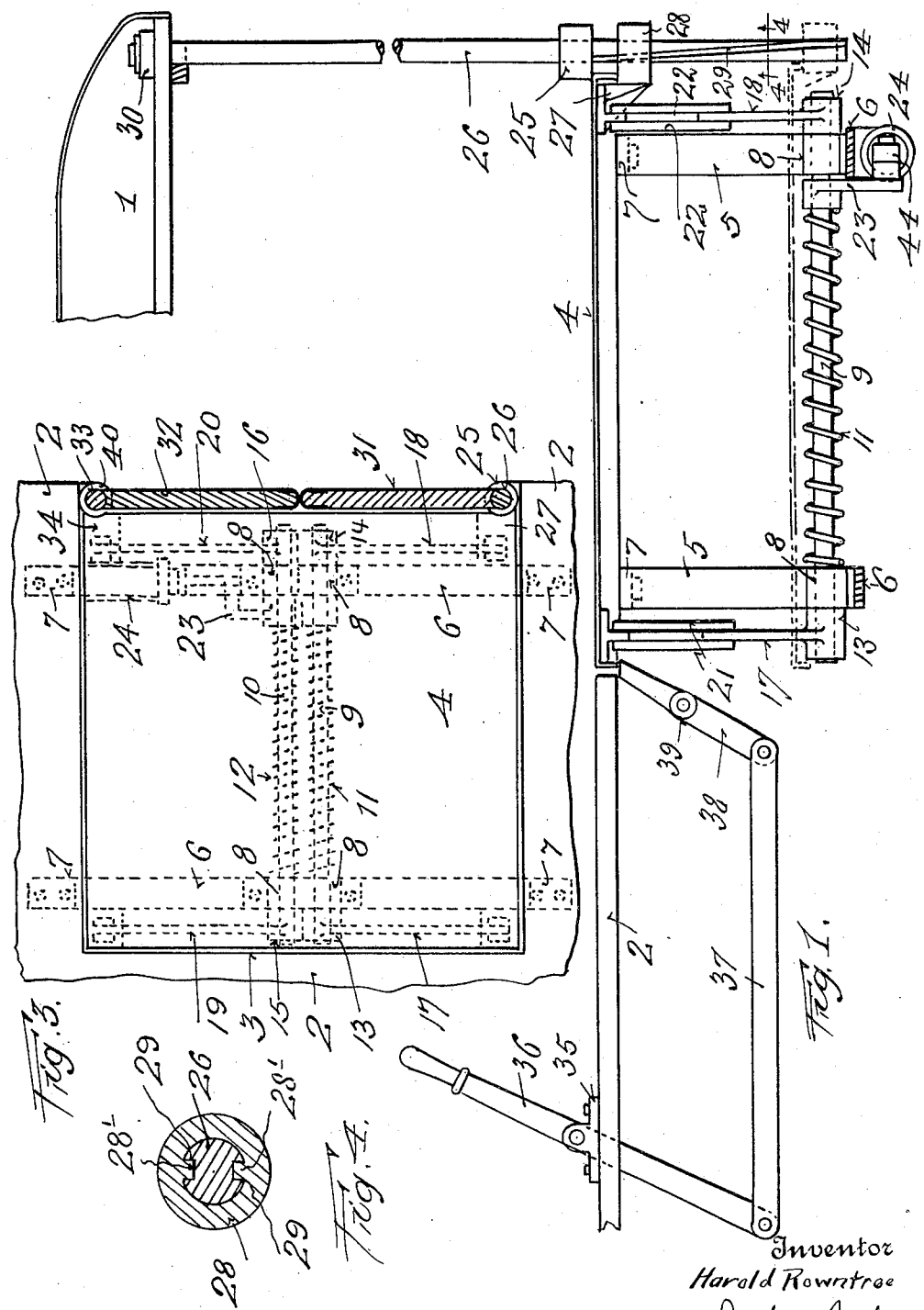

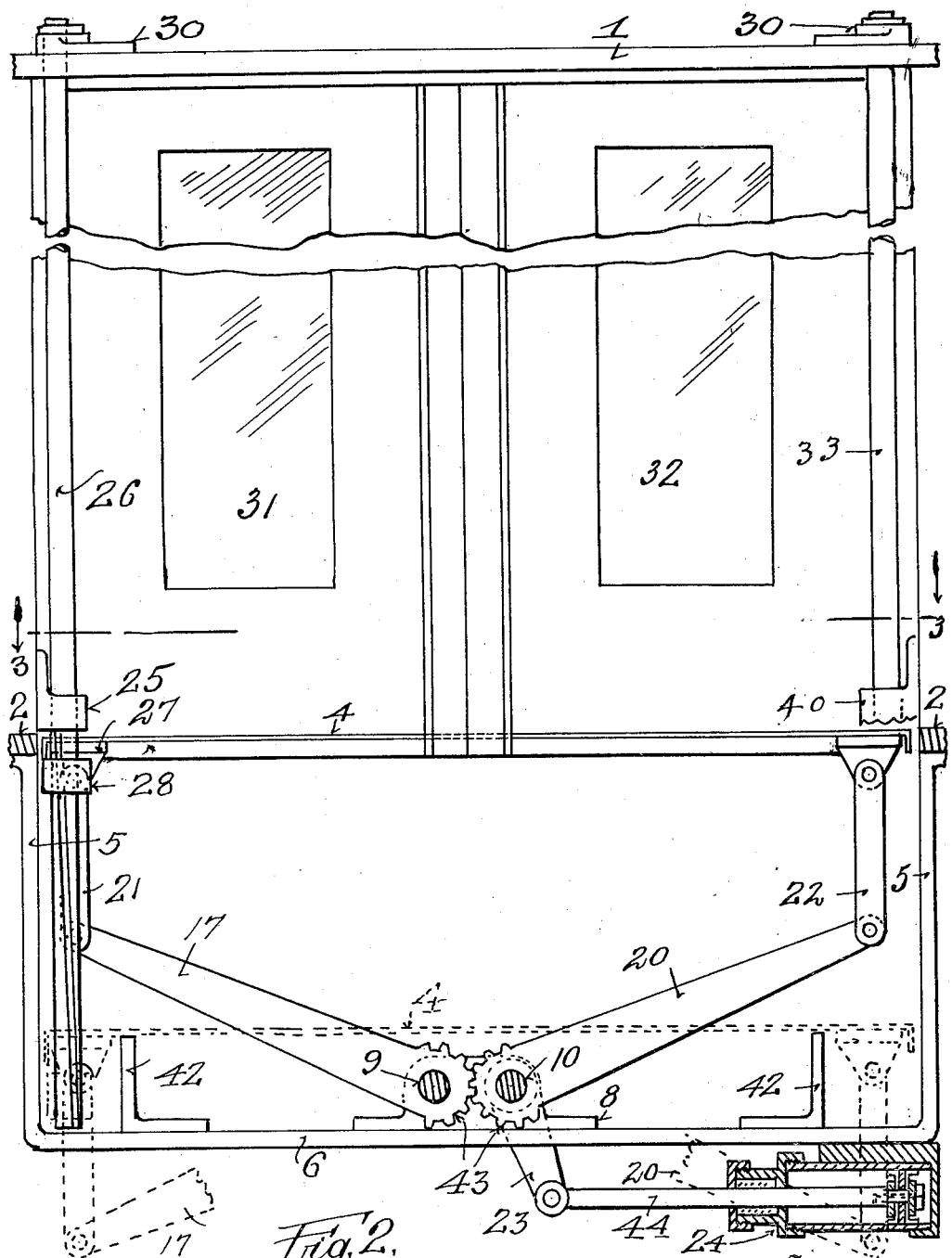

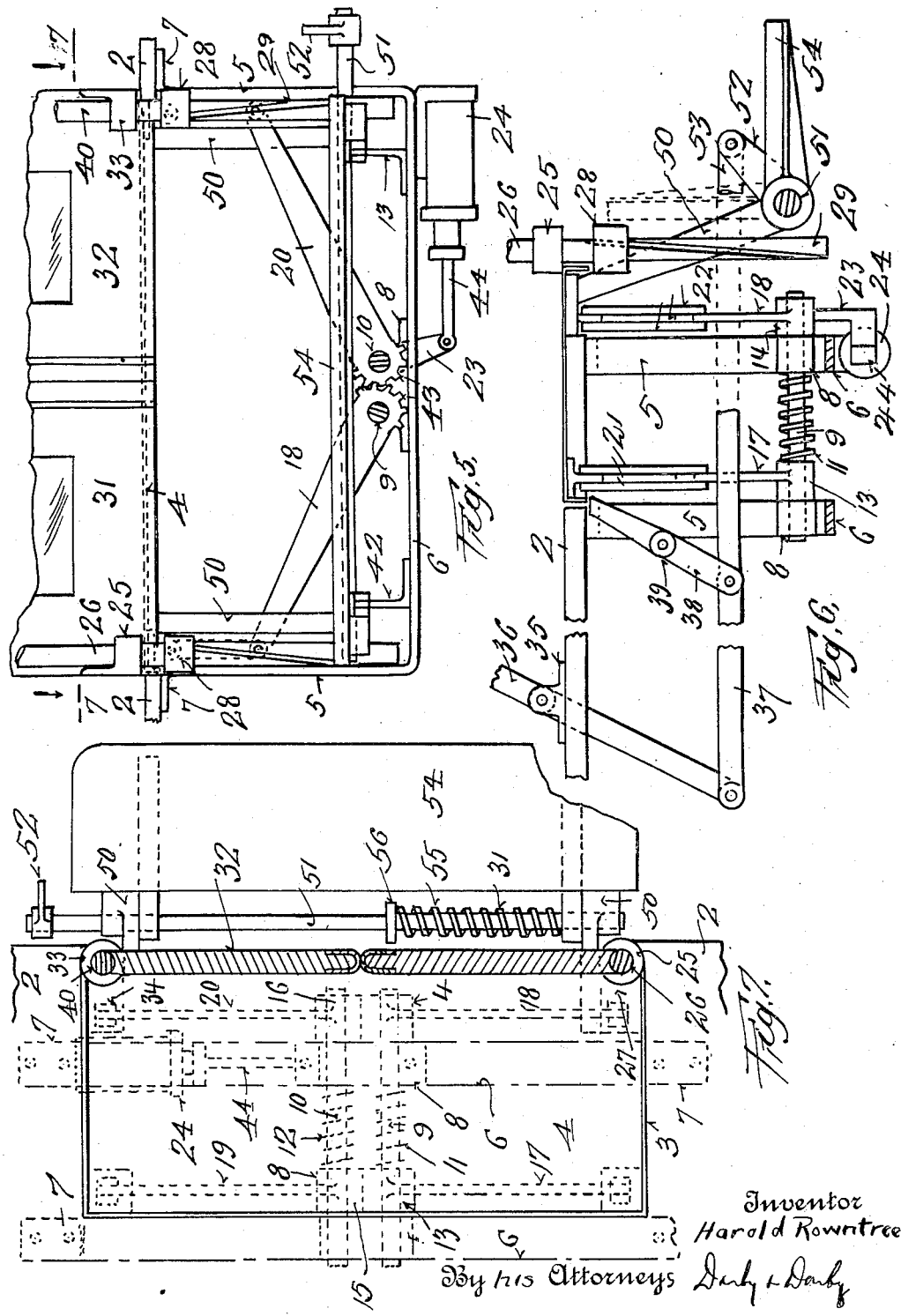

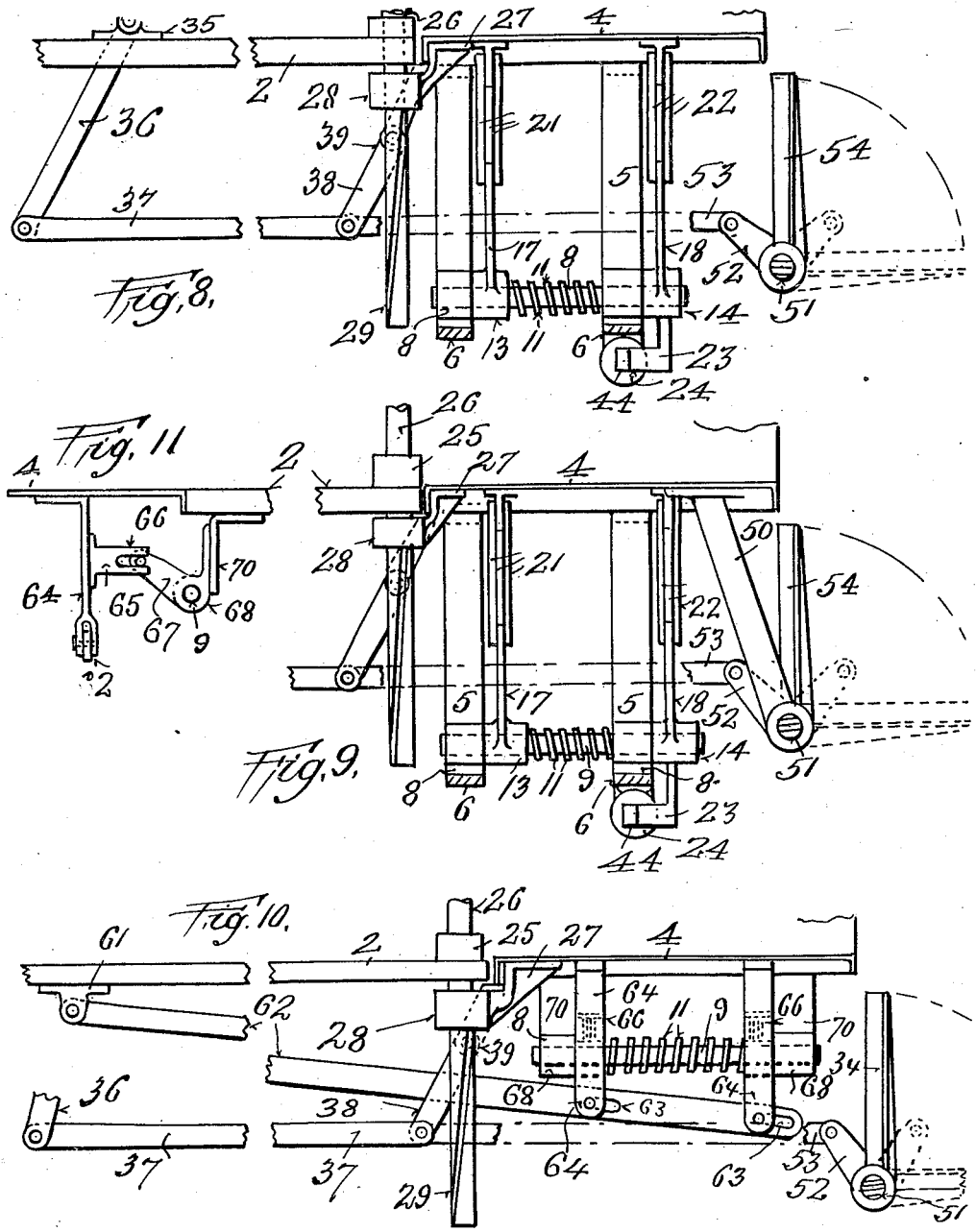

Patented Jan. 13, 1931

1,788,409

UNITED STATES PATENT OFFICE

HAROLD ROWNTREE, OF SCARSDALE, NEW YORK, ASSIGNOR TO NATIONAL PNEUMATIC COMPANY, OF NEW YORK, N. Y., A CORPORATION OF WEST VIRGINIA

ENGINELESS TREADLE CONTROL FOR VEHICLE DOORS

Application filed January 7, 1928. Serial No. 245,094.

This invention relates in general to door operating devices.

One of the objects of this invention is the provision of door operating devices for vehicle doors comprising a treadle.

A further object of this invention is the provision of a treadle arrangement for causing the operation of vehicle doors to cause them to open under the weight of a passenger standing on the treadle.

A further object of this invention is the provision of treadle means for operating the doors of vehicles including arrangements for operating the entrance doors and arrangements for operating the exit doors.

A further object of this invention is the provision of a vertically movable treadle plate in the platform of vehicles connected to the doors thereof so that the treadle descends under the weight of a passenger to cause the doors to open.

A further object of this invention is the provision of a device of this type having means for preventing the too rapid descent of the treadle, which means is adapted to return the treadle to its raised position and close the doors when it is cleared of weight.

A further object of this invention includes, in one form, the addition of a folding step adapted to descend with the treadle.

A further object of this invention is the provision of locking means for preventing the descent of the treadle or treadle and step when desired.

A further object of this invention is the provision of a treadle plate in the floor of vehicles adjacent their doors and connected thereto to open the doors under the weight of a passenger, said treadle being adapted to move downwardly to provide an intermediate step between the car platform and the ground.

A further object of this invention is the provision of a depressible treadle plate having a step mounted thereon, said treadle being connected to the doors to open them as it is depressed, the car platform, the treadle and the step forming a series of steps from the car platform level to the ground.

Another object of this invention is the provision of means of the type where the treadle and step descend for controlling the downward rate of travel of the treadle and step and adapted to return them to normal position when relieved of weight.

A further object of this invention is the provision of means for locking the treadle and step against downward movement when desired, said locking means in one form of the invention being adapted to fold and unfold the step.

These and other objects, as will appear from the following description, are secured by means of this invention.

This invention resides substantially in the combination, construction, arrangement, and relative location of parts all as will more fully appear in the following disclosure when taken in conjunction with the drawings.

The various figures in the drawings, which have been given for purposes of illustration only, illustrate various forms of the invention.

Figure 1 is a side elevational view of the device as applied to a vehicle with the unessential parts broken away;

Fig. 2 is a front elevational view of the device showing the doors with various parts of the vehicle broken away to more clearly illustrate the purposes of this invention;

Fig. 3 is a cross sectional view taken on the line 3—3 of Fig. 2;

Fig. 4 is a cross sectional view taken on the line 4—4 of Fig. 1;

Fig. 5 is a front elevational view of a modified form of the invention employing a folding step;

Fig. 6 is a side elevational view of modified form of the invention shown in Fig. 5;

Fig. 7 is a cross sectional view taken on the line 7—7 of Fig. 5;

Fig. 8 is a side elevational view of a modified form of the device employing a folding step mounted on the vehicle body;

Fig. 9 is another modification of the device showing the folding step mounted on the treadle;

Fig. 10 is still a further modification of the device employing a folding step mounted on the vehicle; and Fig. 11 is an enlarged detail view of one of the features of the device of Fig. 10.

Heretofore it has been the usual custom in various forms of vehicles, such as street cars, subway cars, railway cars, and the like, to employ various forms of movable doors in the entrance and exit ways thereof. In modern practice various forms of power operated devices have been employed for effecting the opening and the closing operations of the doors. The equipment necessary to effect these operations, which has usually been of the pneumatic or electric type, is rather complicated and expensive and is subject to easy derangement requiring skilled workers to keep it in efficient operative condition. By means of the apparatus disclosed hereinafter this complicated apparatus may be eliminated and the opening and the closing operations of the doors effected by the passenger himself.

In the various forms of the device which I have conceived employing the principles of this invention a vertically movable treadle plate is mounted in the platform of the vehicle adjacent the doors and is adapted to move downwardly under the weight of a passenger standing thereon. Connections are employed between the movable treadle and the vertical shafts on which the doors are mounted so that as the treadle descends the doors are opened. Devices are employed for limiting the downward rate of movement of the treadle and hence the speed with which the doors open. These same devices are arranged to cause the return upward movement of the treadle to its normal position to effect the closing operation of the doors when the passenger alights from the treadle. In some forms of devices a folding step is employed which is connected to the means for locking the treadle against downward movement so that as the treadle is unlocked the step is unfolded. In other forms of the device the folding step, which operates in the same manner, is mounted on the treadle to descend with it. The treadle plate in its lower limit of downward movement provides in conjunction with the platform of the vehicle a step intermediate the platform and the ground. In those forms of the device where the folding step is mounted on the treadle it likewise provides an additional step between the platform level of the car and the ground level. Each of these forms of the device may be employed for the entrance and exit ways of the vehicle but it is preferable to have those forms of device in which the folding step is mounted directly on the vehicle framework for entrance ways.

For a better understanding of the invention reference is made to the drawings in which the top of the vehicle is indicated in general at 1. The vehicle platform is shown at 2 provided with a well or opening 3 therein within which the treadle plate 4 is mounted so as to be on a level with the platform 2 when in its normal raised position. Mounted under the treadle plate to the lower side of the platform are two U-shaped brackets comprising the vertical portions 5, horizontal portions 6 at one end, and the horizontal portions 7 at the other end. The horizontal portions 7 are on the upper ends of the brackets and are bolted to the underside of the platform 2. The distance between the arms 5 of the U-shaped brackets is such that the treadle may be guided in its upper and downward movement therebetween. Mounted on the horizontal portions 6 of the brackets are the bearings 8 within which are rotatably mounted the two parallel shafts 9 and 10 which are encircled respectively by the springs 11 and 12. One end of each of the springs is attached or fixed to the bearing or bracket and the other end is attached to the corresponding shaft so that upon rotation of the shafts the springs are tensioned to resist their rotation.

The collars 13 and 14 to which the arms 17 and 18, respectively, are attached are mounted on the shaft 9 for rotation therewith. The collars 15 and 16 to which the arms 19 and 20 are attached are mounted on the shaft 10 for rotation therewith. The lower faces of the collars are provided with intermeshing teeth 43, as clearly shown in Fig. 2. The free ends of each of the arms 17, 18, 19 and 20 are connected by links to the undersurface of the treadle 4. As clearly shown, for instance in Figs. 1 and 2, the arms 17 and 20 are pivotally connected by the links 21 and 22 to the underside of the treadle plate 4. The shaft 10 is also provided with the short arm 23 which is connected to the piston rod 44 of the dashpot 24. The door shafts 26 and 33 are shown mounted in bearings 25 and 40 at a level with the car platform and their upper ends are mounted in the bearings 30 on the vehicle top 1. Brackets 27 and 34 are mounted on the underside of the treadle plate 4 adjacent the door shafts 26 and 33, respectively. These brackets (of which only one is shown in Fig. 1) are provided with nuts or collars 28 which encircle the door shafts. As is apparent from the drawings, the door shafts project below the level of the car platform. The lower portions of the shafts are each provided with a spiral slot or groove 29 which has a very high pitch. As clearly shown in Fig. 4, the nut or collar 28 which encircles the shaft 26 is provided with short inwardly projecting lugs 28' which ride in the groove 29. As shown in Fig. 4 the shaft 26 is provided with two grooves but a larger number may be employed if desired.

The doors 31 and 32 are shown mounted on the shafts 26 and 33, respectively. Mounted on the vehicle platform 2 is a bearing member 35 in which the lever 36 is pivotally mounted. This lever extends both above and below the platform of the vehicle and is pivotally connected at its lower end by means of the link 37 to the lever 38 mounted on the pivot 39. In the position shown in Fig. 1 the lever 38 projects under the edge of the treadle 4 to prevent its downward movement. When the upper end of the lever 36 is moved to the left the lever 38 is drawn out of engagement with the treadle 4 to permit its downward descent under the weight of a passenger. As shown in Fig. 2 short L-shaped brackets are supported on the horizontal portions 6 of the U-shaped brackets and, as shown in the dotted position in this figure, provide stops to limit the downward movement of the treadle 4.

When the vehicle comes to a stop to permit the exit of a passenger the car attendant moves the lever 36 to unlock the treadle. The passenger who wishes to alight is standing on the treadle and when the lock is withdrawn the treadle slowly descends against the resistance of the springs 11 and 12 and against the action of the dashpot 24 so that its downward movement is not too rapid. As the treadle 4 descends the arms 17, 18, 19 and 20 are rotated to the dotted position shown in Fig. 2. It is the movement of these arms which causes the tensioning of the springs and the movement of the piston in the dashpot. At the same time as the treadle descends it carries with it the nuts or collars 28 which through the action of the lugs 28' in the grooves 29 of the door shafts cause the door shafts to rotate and thereby open the doors. As will be apparent from the drawings the doors in this case will open outwardly. When the treadle comes to rest on engaging with the stops 42 the passenger may step therefrom to the ground. As soon as the treadle is relieved of the weight of the passenger the springs 11 and 12 and the air compressed in the dashpot 24 react to cause the treadle to move upwardly to its normal position and at the same time to cause the doors to close. The attendant then locks the treadle against downward movement. It hardly need be pointed out here that many other forms of locks may be employed for preventing the movement of the treadle. For instance, besides other forms of mechanical locks it is possible to employ electrically operated or fluid pressure operated locks which may readily be controlled by the car attendant through the agency of a switch or valve. It is apparent likewise that the lock may be interconnected with either the outer controls of the vehicle or the braking system of the vehicle so that when the power is shut off or the brakes applied the treadle is unlocked. This form of the device is particularly adapted for the exit ways of the vehicle although I do not wish to be understood as limiting its use to said exit ways.

In Figs. 5, 6, and 7 I have illustrated another form of this invention in which a folding step is employed in conjunction with the treadle plate and mounted on brackets at the underside thereof. As will be readily apparent from these drawings the major portion of the equipment is the same as that already described and its description need not be repeated here. The distinguishing feature of this form of the invention consists of the brackets 50 connected to the underside of the treadle for vertical movement. Mounted in bearings on the lower ends of these brackets is a rotatable shaft 51 to which the short arm 52 is attached for rotation therewith. Mounted on the shaft 51 for rotation therewith is a step 54. In this form of the invention a second link 53 is pivotally connected between the lower end of the lever 38 and the free end of the arm 52. When the lever 36 is moved to unlock the treadle to permit its downward movement the folding step 54 is moved from the dotted position shown in Fig. 6 to the full line position. Mounted on the shaft 51 is a spring 55 which is attached at one end to the member 56 and has its other end attached to one of the arms on which the step 54 is mounted. Thus, as the step is moved from its folded to unfolded position the spring is tensioned and as a result the spring aids in the return of the step to its folded position. In this form of the device when the treadle is unlocked and the step is unfolded a passenger on the treadle plate causes its descent as well as that of the unfolded step 54. When the treadle plate and step are cleared of the passenger's weight they return under the action of the springs 11 and 12 and the air compressed in the dashpot 24. This particular form of the invention is adapted for use in the entrance ways of vehicles rather than in the exit ways although it might be used in both exit ways and entrance ways. Thus, when used in entrance ways the car attendant unlocks the treadle by moving the lever 36 and at the same time unfolds the step 54 which is at such a position above the ground level as to permit the passenger to step thereon. This causes a descent of the step and the treadle and as a result the doors open. The passenger then steps from the step 54 to the treadle plate 4 and from the treadle plate 4 to the level of the car platform 2. As the passenger then moves from the treadle into the car the treadle is freed of weight and may return to its normal position where it may be locked. The locking operation also affects the folding of the step.

The modification shown in Fig. 8 also employs a folding step but in this case the folding step is mounted in any suitable and well known manner on the vehicle platform. When the treadle is unlocked by means of the lever 36 the step is unfolded. If this form of the device is used in the entrance way of a vehicle the passenger then steps onto the step then onto the treadle plate 4, and his weight on the treadle plate 4 then causes the doors to open. The important feature to note about this form of the invention is that the treadle plate is mounted on the outside of the vehicle, so to speak, with reference to the doors so that access may be had thereto before the doors are opened. As the treadle descends under the weight of the passenger the doors open and the passenger may then step from the treadle to the car platform and as he moves into the car, relieving the treadle of his weight, the treadle returns to close the doors. This form of the device is particularly adapted for use in entrance ways of vehicles but is not necessarily restricted thereto.

In the arrangement of Fig. 9 the folding step is mounted on the brackets 50 at the underside of the treadle plate and when the treadle plate is unlocked the step is moved to unfolded position. As with the arrangement of Fig. 8 the treadle plate 4 is mounted on the outside of the vehicle so that access may be had thereto even when the doors are closed. To gain entrance the passenger steps on the unfolded step 54 and thence to the treadle 4. As soon as his weight is placed on the step the treadle begins to descend and by the time he is on the treadle plate it has fully descended to cause the doors to open. He then steps up into the vehicle through the open doors. This form of the device is likewise particularly adapted for the entrance ways of vehicles but is not limited thereto.

In Figs. 10 and 11 a somewhat modified form of the invention is employed. The car platform is shown at 2 and supports a lower bearing 25 for the door shaft 26 and, as before, the treadle plate 4 is mounted in an opening in the platform 2 and is provided with a bracket 27 on which the nut or collar 28 is mounted. As before, the lever 36 is pivoted on the car platform and connected by the link 37 to the locking lever 38. The folding step 54 is mounted on the rotatable shaft 51 journalled in bearings on the vehicle framework. The arm 52 keyed to the shaft 51 is connected by the pivoted link 53 to the link 37. The brackets 70 are mounted on the underside of the treadle plate 4 to form bearing supports for the rotatable shaft 9 which is encircled as before by the spring 11. The under surface of the treadle 4 is likewise provided with brackets 64 which are pivotally connected to the rods 62 in the slots 63. One end of each rod 62 is pivotally mounted in the bracket 61 on the lower side of the platform 2. The brackets 64 are provided with short projecting arms 65 having the bifurcated ends 66. The brackets 70 are provided with the bearing 68 in which the shaft 9 is rotatably mounted. The arms 67, secured to the shaft 9, are each provided at their outer end with a pin which moves in the bifurcated end 66 of the members 65. In this arrangement as before the treadle is mounted on the outside of the vehicle with respect to the doors and is particularly adapted for the entrance ways of vehicles. When the treadle is unlocked the step is at the same time unfolded. The passenger steps on to the step and from the step to the treadle 4. The treadle 4 descends carrying with it the brackets 64 and the member 65. The downward movement of these elements causes the rotation of the arm 67 and shaft 9 against the action of the springs 11. The downward movement of the treadle, as before, causes the nut or collar 28 to rotate the door shaft 26 to open the door. It will be understood that these parts are duplicated on the other side of the treadle so that the other door shaft may be operated and the rods 62 are provided to guide the downward movement of the mechanism.

The foregoing description clearly sets forth the principles of my invention which I am aware may be embodied in many other forms of devices. I do not, therefore, desire to be particularly limited to the constructions given for purposes of illustration since other forms of the device will be apparent to those skilled in the art and I wish it to be distinctly understood that I am only to be limited by the principles of my invention as defined by the appended claims.

What I seek to secure by United States Letters Patent is:

1. The combination with a vehicle having entrance and exit ways therein, doors in said ways and rotatably grooved shafts for said doors, of vertically movable means adapted to serve as a step mounted adjacent the doors, together with a plurality of kinematic links connecting said means with said doors through a collar having a lug thereon adapted to ride in the groove in said shafts to cause the operation of the doors upon movement of said means under the weight of a passenger.

2. The combination with a vehicle having entrance and exit ways and movable doors in said ways, of a vertically movable treadle plate adjacent said doors adapted to serve as a step when in descended position, locking means for preventing the movement of said treadle plate, and means connecting said treadle plate to said doors whereby the weight of a passenger operates directly as the door actuating force when said locking means are removed.

3. The combination with a vehicle having entrance and exit ways and barriers in said ways, of a vertically movable treadle plate mounted in the platform of the vehicle adjacent said doors, means for locking said treadle plate against movement, and a folding step mounted on said treadle plate for movement therewith.

4. The combination with a vehicle having entrance and exit ways and barriers in said ways, of a vertically movable treadle plate mounted in the platform of the vehicle adjacent said doors, means for locking said treadle plate against movement, a folding step mounted on said treadle plate for movement therewith, and means operated by said locking means for unfolding the step when the treadle plate is unlocked.

5. The combination with a vehicle having entrance and exit ways and barriers mounted on rotatable shafts in said ways, of a vertically movable treadle plate mounted in the platform of the vehicle and adapted to serve as a step when in descended position, means including collars for said shafts for connecting the treadle plate with the doors for causing their movement upon the downward movement of the treadle, and means for controlling the downward movement of the treadle under the weight of the passenger and causing the return of the treadle when it is relieved of weight, such weight being transmitted by said first mentioned means to act directly on the barriers to cause said movement.

6. The combination with a vehicle having entrance and exit ways and barriers mounted on rotatable shafts in said ways, of a vertically movable treadle plate mounted in the platform of the vehicle and adapted to serve as a step when in descended position, continuous mechanical means including collars for said shafts for connecting the treadle plate with the barriers for causing their movement upon the downward movement of the treadle under a passenger's weight acting as the door actuating force, means for controlling the downward movement of the treadle and causing its return, and means for locking the treadle against movement.

7. The combination with a vehicle having entrance and exit ways therein and barriers in said ways, said barriers being mounted on vertical rotatable shafts, of a vertically movable treadle plate mounted in the platform of the vehicle and adapted to serve as a step when in descended position, continuous mechanical means including collars for said shafts mounted on said treadle plate and associated with the barrier shafts for causing their rotation upon downward movement of the treadle plate under a passenger's weight acting as the door actuating force, and means for locking the treadle plate against movement.

8. The combination with a vehicle having entrance and exit ways therein and barriers in said ways, said barriers being mounted on vertical rotatable shafts, of a vertically movable treadle plate mounted in the platform of the vehicle, means mounted on said treadle plate and associated with the barrier shafts for causing their rotation upon downward movement of the treadle plate, means for preventing too rapid downward movement of the treadle, said means being adapted to return the treadle to raised position, and means for locking the treadle against movement.

9. The combination in a vehicle having entrance and exit ways and barriers in said ways, of means mounted in the platform of said vehicle adapted for vertical movement, a folding step mounted on the vehicle, and means for locking said means against movement, said locking means being adapted to unfold the step when moved to unlocking position.

10. The combination in a vehicle having entrance and exit ways and barriers in said ways, said barriers being mounted on vertical rotatable shafts, of a vertically movable treadle plate mounted in the platform of the vehicle, connecting means between said treadle plate and shafts for effecting the movement of the barriers upon the downward movement of the treadle, means for cushioning the downward movement of the treadle, and means for returning the treadle to raised position.

11. The combination in a vehicle having entrance and exit ways and barriers in said ways, said barriers being mounted on vertical rotatable shafts, of a vertically movable treadle plate mounted in the platform of the vehicle, connecting means between said treadle plate and shafts for effecting the movement of the barriers upon the downward movement of the treadle, means for cushioning the downward movement of the treadle, means for returning the treadle to raised position, and means for locking the treadle against movement.

12. The combination in a vehicle having entrance and exit ways and barriers in said ways, said barriers being mounted on vertical rotatable shafts, of a vertically movable treadle plate mounted in the platform of the vehicle, connecting means between said treadle plate and shafts for effecting the movement of the barriers upon the downward movement of the treadle, means for cushioning the downward movement of the treadle, means for returning the treadle to raised position, means for locking the treadle against downward movement, a folding step mounted on the treadle, and means connecting the locking means for effecting the unfolding of the step when the treadle is unlocked.

13. The combination in a vehicle having entrance and exit ways therein, movable barriers in said ways, and shafts on which said barriers are mounted, of a treadle plate mounted in the platform of the vehicle and adapted to move downwardly under the weight of a passenger and to serve as a step when in descended position, and means including collars for said shafts connecting said treadle plate and shafts for rotating the shafts as the treadle plate descends under the weight of a passenger.

14. The combination in a vehicle having entrance and exit ways and movable barriers mounted on rotatable shafts in said ways, of a treadle plate mounted exteriorly of said barriers and adapted to serve as a step on vertical movement, means for locking said treadle plate against movement, and means connecting said treadle plate and barrier shafts to effect the movement of the barriers upon movement of the treadle.

15. The combination in a vehicle having entrance and exit ways and movable barriers mounted on rotatable shafts in said ways, of a treadle plate mounted exteriorly of said barriers and adapted for vertical movement, means for locking said treadle plate against movement, connections between said treadle plate and shafts for effecting the movement of the barriers upon movement of the treadle plate, a folding step mounted on said treadle plate, and means for unfolding said step.

16. The combination in a vehicle having entrance and exit ways and movable barriers mounted on rotatable shafts in said ways, of a treadle plate mounted exteriorly of said barriers and adapted for vertical movement, means for locking said treadle plate against movement, connections between said treadle plate and barrier shafts for effecting the movement of the barriers upon movement of the treadle plate, a folding step mounted on the vehicle, and means for simultaneously unlocking the treadle plate to permit its downward movement and for unfolding the step.

17. The combination with a vehicle having passageways therein, doors in said passageways and vertical grooved rotatable shafts for said doors, of means, including a descendible treadle plate adapted to serve as a step mechanically interconnected with a vertically movable collar having a lug thereon adapted to ride in the groove on the shaft of each door to rotate the same, mounted adjacent the doors whereby the weight of a passenger acting on said treadle directly operates as the door opening force, and a second step carried by said treadle.

18. The combination with a vehicle having entrance and exit ways and movable barriers mounted on rotatable shafts in said ways, of a treadle plate adapted to serve as a step mounted in the platform of said vehicle adjacent said barriers, a second step carried by said treadle means to lock said treadle plate against movement and fold said second step, and means including a collar for the shafts of said barriers, mechanically connecting means on said barriers.

19. The combination with a vehicle having entrance and exit ways and barriers mounted on rotatable shafts in said ways, of a movable treadle plate mounted in the platform of the vehicle adjacent said barriers adapted to serve as a step when at the end of its movement, means to lock said treadle plate against movement, and means, including a collar for the shafts of said barriers, connecting said treadle plate and said barriers to effect the movement of the doors upon movement of the treadle plate, when said locking means are removed, and means for controlling the movement of the treadle plate.

20. The combination with a vehicle having entrance and exit ways and barriers mounted on rotatable shafts in said ways, of a movable treadle plate mounted in the platform of the vehicle adjacent said barriers adapted to serve as a step when at the end of its movement, a second foldable step carried by said treadle plate, continuous means including a collar for the shafts of said barriers, directly and mechanically connecting said treadle plate and said barriers to effect the movement of the doors upon movement of the treadle plate under a passenger's weight acting as the door actuating force, means for controlling the movement of the treadle plate, and means for locking the treadle plate against movement, and folding the second step.

In testimony whereof I have hereunto set my hand on this 4th day of January, A. D., 1928.

HAROLD ROWNTREE.